(12) United States Patent
Kruger (10) Patent No.: US 9,935,449 B1
(45) Date of Patent: Apr. 3, 2018

(54) WIRE OVERMOLD DEVICE AND METHOD OF FORMING WIRE OVERMOLD DEVICE

(71) Applicant: HAMLIN ELECTRONICS (SUZHOU) CO. LTD, Suzhou Industry Park (CN)

(72) Inventor: Jay Kruger, Chicago, IL (US)

(73) Assignee: LITTELFUSE, INC., Chicago, IL (US)

( * ) Notice: Subject to any disclaimer, the term of this patent is extended or adjusted under 35 U.S.C. 154(b) by 0 days.

(21) Appl. No.: 15/474,013

(22) Filed: Mar. 30, 2017

(51) Int. Cl.
*H05K 5/02* (2006.01)
*H02G 15/04* (2006.01)
*B60R 16/02* (2006.01)

(52) U.S. Cl.
CPC ....... *H02G 15/043* (2013.01); *B60R 16/0215* (2013.01); *H05K 5/02* (2013.01)

(58) Field of Classification Search
CPC ..... H02G 15/043; B60R 16/0215; H05K 5/02
USPC ........................................................ 174/535
See application file for complete search history.

(56) References Cited

U.S. PATENT DOCUMENTS

| | | | | |
|---|---|---|---|---|
| 5,906,513 | A  * | 5/1999 | Peterson | H01R 9/032 439/320 |
| 9,209,544 | B2 * | 12/2015 | Glynn | A61N 1/3752 |
| 9,350,087 | B2 * | 5/2016 | Fink | H01R 4/00 |
| 9,696,334 | B2 * | 7/2017 | Shimizu | G01P 3/44 |
| 2011/0108306 | A1 * | 5/2011 | Parham, Jr. | H01R 24/64 174/81 |
| 2012/0326398 | A1 * | 12/2012 | Kobayashi | F16C 33/723 277/637 |
| 2015/0355213 | A1 * | 12/2015 | Kobayashi | G01P 1/026 324/207.25 |
| 2016/0069923 | A1 * | 3/2016 | Shimizu | G01P 3/44 73/115.08 |
| 2016/0087383 | A1 * | 3/2016 | Glynn | A61N 1/3752 439/669 |

* cited by examiner

*Primary Examiner* — Timothy Thompson
*Assistant Examiner* — Michael F McAllister (57) ABSTRACT

A wire overmold device including a carrier body having a distal end and a proximal end, a wire cap configured to engage the distal end of the carrier body, at least one of a jacketed cable and one or more wires at least partially enclosed between the wire cap and the carrier body, and an overmold formed over the proximal end of the carrier body and at least portions of the wire cap and the distal end of the carrier body, wherein the wire cap and the distal end of the carrier body protrude from the overmold.

10 Claims, 9 Drawing Sheets

WIRE OVERMOLD DEVICE AND METHOD OF FORMING WIRE OVERMOLD DEVICE

FIELD OF THE DISCLOSURE

Embodiments of the present disclosure relate generally to the field of electrical conductors, and more particularly to wire overmold devices.

BACKGROUND OF THE DISCLOSURE

Sensors, electronics, and wire connectors used in automotive applications are commonly housed in protective enclosures to protect such components from debris, fluids, and extreme temperatures present in automotive environments. A sensor may be connected to one or more insulated conductor wires or jacketed cable, which extend a desired length beyond a protective enclosure for connection to other components. The sensor and at least a portion of the extending wires may be encapsulated in epoxy or thermoset to seal and protect the wires. However, use of an epoxy or thermoset does not allow for an efficient way to locate and position the wires or jacketed cable in a desired manner during encapsulation. This may result in wires not being properly positioned once the thermoset or epoxy sets, which may lead to damage or premature failure.

The sensor and at least a portion of the wires extending therefrom may alternatively be enclosed in an overmold, which may protect the sensor and associated electronic components and allow for a generally more reliable positioning of the wires relative to the sensor and associated electronic components. The connecting wires may extend out of the overmold for connection to other automotive components. However, when the wires are not securely held in a desired position at an end of the overmold, during the molding operation one or more of the wires may shift and become caught in the mold enclosure during the operation. Thus, when the mold is closed, a portion of the wires extending out of the overmold may be crimped and insulation on the wires or jacketed cable may be damaged, potentially resulting in an electrical leak path or fluid leak path and rendering some or all of the overmolded components useless.

Additionally, if the extending wires cannot be reliably held in a desired position and orientation during overmolding, the number of possible configurations and arrangements of the extending wires is severely limited. This may result in design constraints that increase manufacturing cost and time.

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An exemplary embodiment of the present invention is a wire overmold device comprising a carrier body having a distal end and a proximal end and a wire cap configured to engage with at least a distal portion of the carrier body. At least one of a jacketed cable and one or more wires is at least partially enclosed between the wire cap and the carrier body. An overmold formed over the proximal end of the carrier body and at least portions of the wire cap and the distal end of the carrier body. The wire cap and the distal end of the carrier body protrude from the overmold.

An exemplary embodiment of the present invention is a method for forming a wire overmold device comprising inserting one or more electronic components and at least one of a jacketed cable and one or more wires in a carrier body, the carrier body having a distal end and a proximal end. The method further includes at least partially enclosing the at least one of a jacketed cable and one or more wires between a wire cap and the carrier body, and forming an overmold over the proximal end of the carrier body and at least portions of the wire cap and the distal end of the carrier body. The wire cap and the distal end of the carrier body protrude from the overmold.

BRIEF DESCRIPTION OF THE DRAWINGS

By way of example, specific embodiments of the disclosed device will now be described, with reference to the accompanying drawings, in which.

DETAILED DESCRIPTION

A wire overmold device in accordance with the present disclosure will now be described more fully hereinafter with reference to the accompanying drawings, in which certain exemplary embodiments of the wire overmold device are presented. The wire overmold device may be embodied in many different forms and is not to be construed as being limited to the embodiments set forth herein. These embodiments are provided so that this disclosure will be thorough and complete, and will convey certain exemplary aspects of the wire overmold device to those skilled in the art. In the drawings, like numbers refer to like elements throughout unless otherwise noted.

Figure 1A:
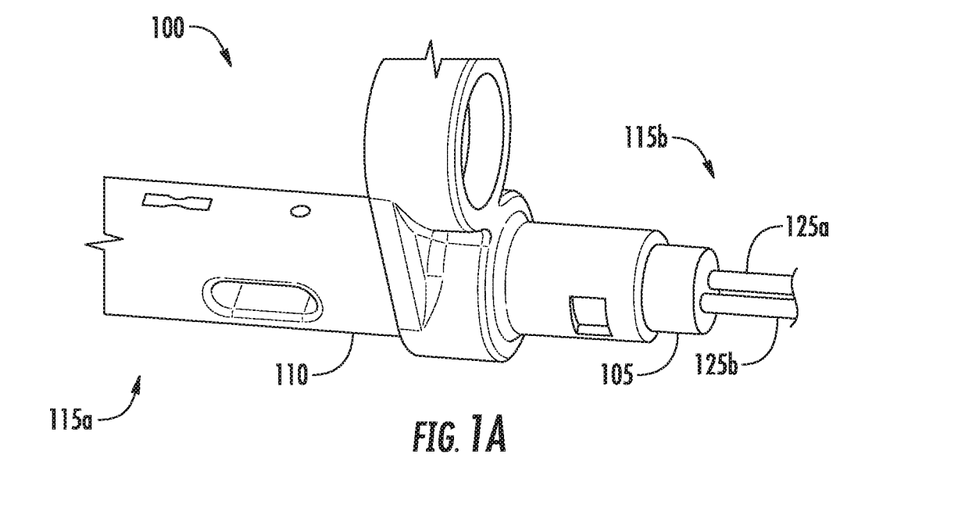
FIGS. 1A and 1B are perspective views illustrating an exemplary embodiment of a wire overmold device in accordance with the present disclosure.
Figure 1B:
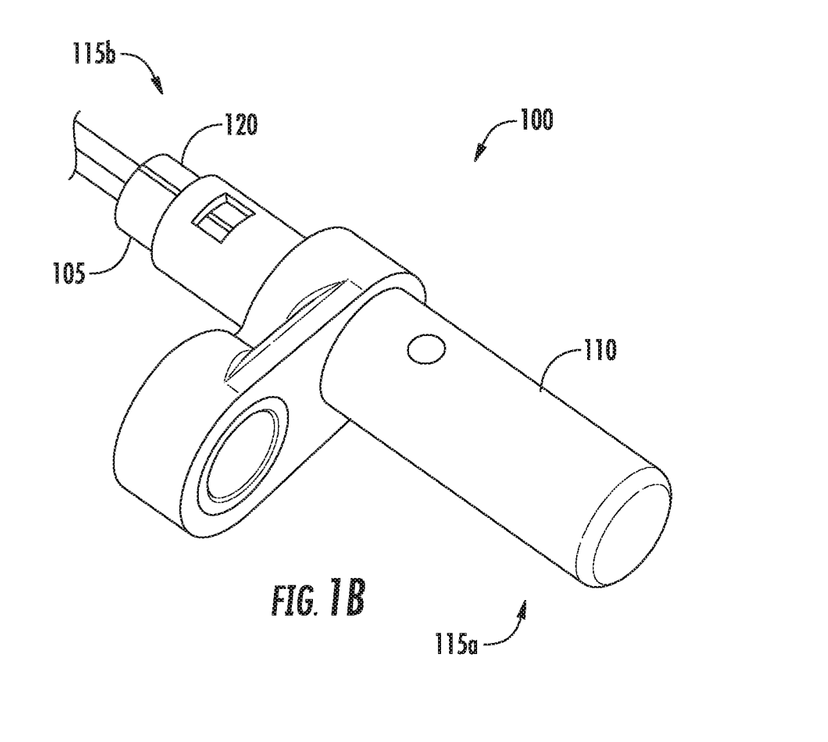
Figure 2:
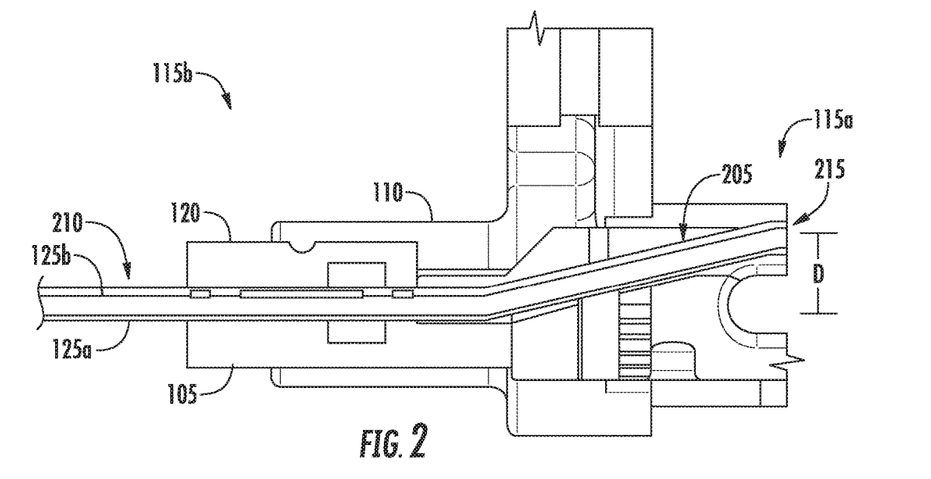
FIG. 2 is a view in section illustrating the wire overmold device shown in FIGS. 1A and 1B.

FIGS. 1A and 1B show perspective views of a wire overmold device 100 in accordance with an exemplary embodiment of the present disclosure. The wire overmold device 100 may include a carrier body 105 at least partially enclosed in an overmold 110. The carrier body 105 may be enclosed by the overmold 110 at a proximal end 115a and may extend beyond the overmold 110 at a distal end 115b. As will be described below, a wire cap 120 may be removably coupled to the carrier body 105 at the distal end 115b for securing the relative position of one or more wires or jacketed cable 125a, 125b extending out of the distal end 115b. FIG. 2 is a view in section of the wire overmold device 100 illustrating wires 125a, 125b inserted in the carrier body 105 and enclosed at the proximal end 115a. The wires 125a, 125b extend to the distal end 115b beyond the overmold 110, the carrier body 105, and the wire cap 120.

An exemplary embodiment of the carrier body 105 is illustrated in FIGS. 3A-3D. The carrier body 105 may include an elongated semi-cylindrical body 305 extending in a direction along axis 310. The semi-cylindrical body 305 may have a curved outer surface 315 and a top surface portion 320, the top surface portion 320 extending in a direction substantially parallel to the axis 310. It should be understood that the carrier body 105 may be any size and shape adapted to the desired application. The carrier body 105 may be made from a variety of materials, including but not limited to, plastic, composite, or the like.

Figure 5A:
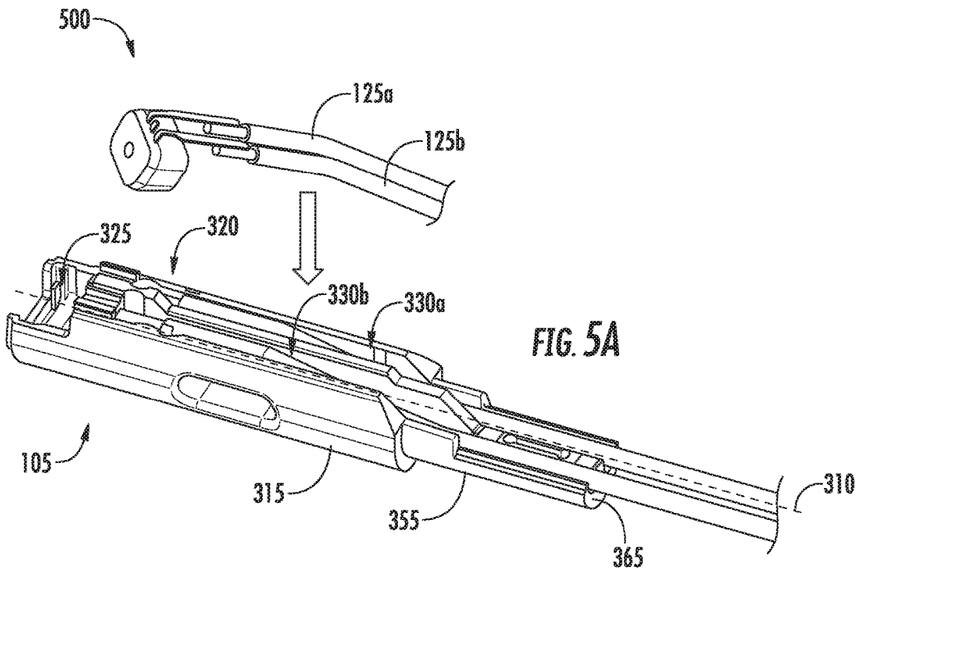
FIGS. 5A-5I are a series of views illustrating a method of forming associated with an embodiment of a wire overmold device in accordance with the present disclosure.

The top surface portion 320 may include a plurality of cavities 325, 330a, 330b, extending into the semi-cylindrical body 305, for receiving and retaining a sensor, electronic components (not shown), and wires 125a, 125b (see FIGS. 1A-2). The cavity 325 may be disposed at the proximal end 115a and may be configured to at least partially receive and retain a sensor, e.g., a Hall sensor, and/or other electronic components (not shown). The cavity 325 may be any size and shape adapted to receive and retain electronic components necessary for a desired application (see FIG. 5A). For example, the electronic components may be a slip fit into the cavity 325 so that a clearance is maintained to protect the electronic components from forces applied to the carrier body 105. A snug, or snap fit may allow the cavity 325 to securely retain the electronic components during assembly and molding processes to minimize displacement and potential damage.

Cavities 330a, 330b may be adjacent the cavity 325 and may extend in a direction along the axis 310 toward the distal end 115b of the carrier body 105. The cavities 330a, 330b may extend substantially parallel to each other, and a dividing wall 335 may extend between the cavities 330a, 330b to maintain a separation of the wires 125a, 125b. The cavities 330a, 330b may have semicircular cross-sections and may be adapted to conformingly receive the respective wires 125a, 125b. Similar to the cavity 325, the wires 125a, 125b may be a snug or snap fit within the cavities 330a, 330b. A snug or snap fit clearance allows the wires 125a, 125b to be at least partially received in the respective cavities 330a, 330b of the carrier body 105 while providing easy assembly and protection from forces applied to the carrier body 105. For example, the carrier body 105 may experience forces applied during a molding process. The cavities 330a, 330b should therefore be sized and shaped to accordingly accommodate wires 125a, 125b for the desired application. In some embodiments, at least first portions 340a, 340b of the respective cavities 330a, 330b may extend substantially parallel to the top surface portion 320 along the axis 310, while at least second portions 345a, 345b may be angled to extend inward to the semi-cylindrical body 305 from the top surface portion 320 (see also FIG. 2). FIG. 2 shows an angled portion 205 of the wire 125a extending a distance d measured in a direction perpendicular to the axis 310 and the top surface portion 320. The angled portion 205 may be disposed between two substantially straight portions 210, 215 of the wire 125a.

Figure 3A:
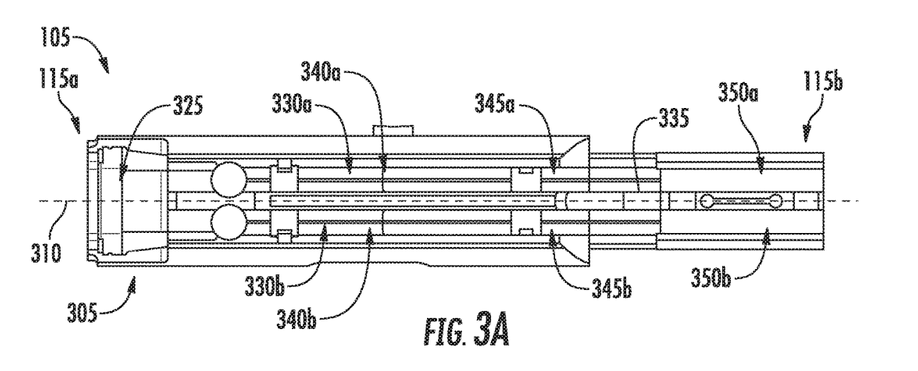
FIGS. 3A-3D are a plurality of side and perspective views illustrating an embodiment of a carrier body of the wire overmold device shown in FIGS. 1A and 1B.
Figure 3B:
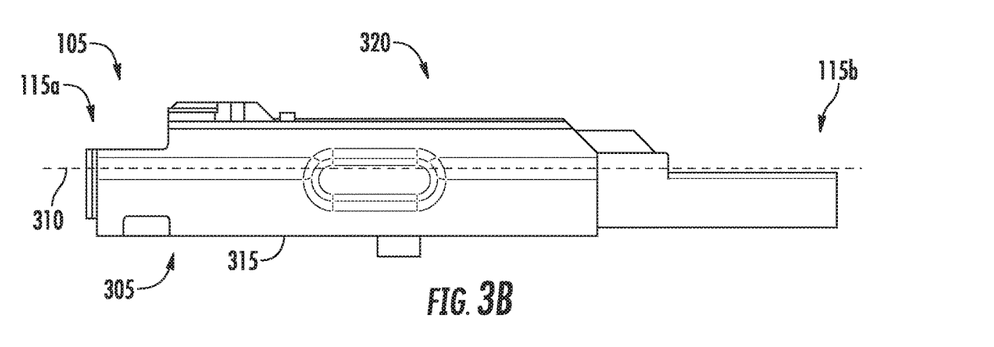
Figure 3C:
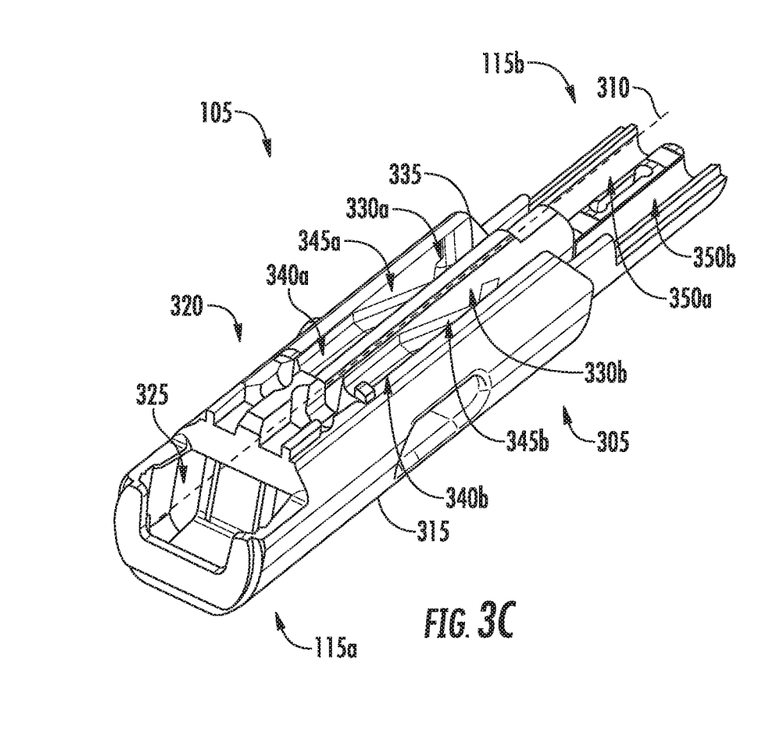

As illustrated in FIGS. 3A-3C, the first portions 340a, 340b are disposed toward the proximal end 115a of the carrier body 105, and the second portions 345a, 345b are disposed toward the distal end 115b of the carrier body 105. In some embodiments, at least third portions 350a, 350b of the respective cavities 330a, 330b may be disposed at the distal end 115b of the carrier body 105, so that the second portions 345a, 345b are disposed between the first portions 340a, 340b and the third portions 350a, 350b. The third portions 350a, 350b may extend substantially parallel to the top surface 320 along the axis 310, for example, at the distance d from the first portions 340a, 340b.

Figure 3D:
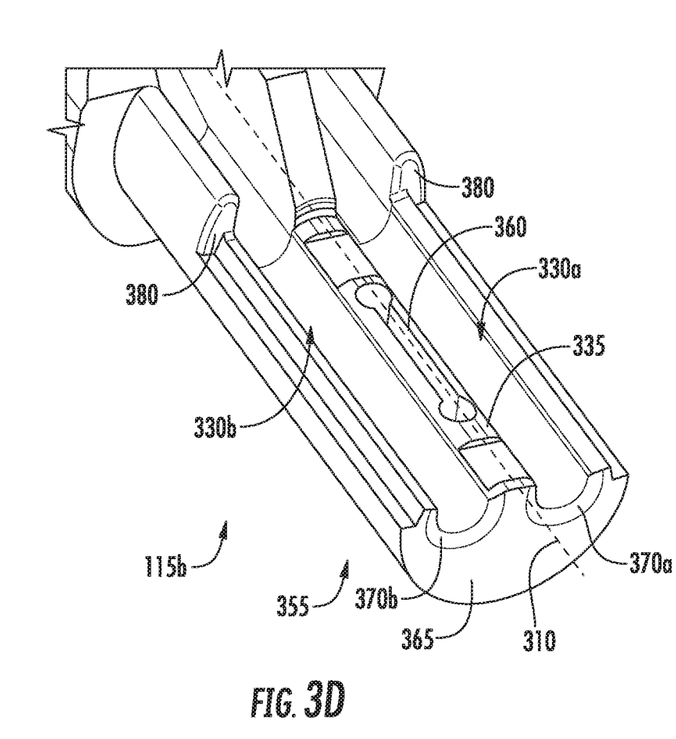

Referring now to FIG. 3D, a detailed view illustrating the distal end 115b of the carrier body 105 is shown. The carrier body 105 may include a distal portion 355. The third portion 350a, 350b of the respective cavities 330a, 330b may be disposed in the distal portion 355, extending along the direction of the axis 310. The wires 125a, 125b may be disposed in the respective cavities 330a, 330b, connected to the sensor or electronic components disposed in the cavity 325 at the proximal end 115a of the carrier body 105 and protrude from the distal portion 355 at the distal end 115b. For example, the wires 125a, 125b may extend beyond end face 365 of the distal portion 355. The cavities 330a, 330b each end at the end face 365 of the distal portion 355. It is advantageous to form a rounded edge 370a, 370b at the respective ends of the cavities 330a, 330b in the end face 365 to prevent wire or jacketed cable damage such as scratching or the like (see also FIG. 5E). In other embodiments, a chamfer or scallop cut may be formed at the respective ends of the cavities 330a, 330b at the end face 365.

The dividing wall 335 may be disposed between the cavities 330a, 330b and may extend in a direction along the axis 310. In some embodiments, the dividing wall may include a recess 360. As will be described below with respect to FIG. 5C, the recess 360 may receive at least a portion of the wire cap 120 to couple the carrier body 105 and the wire cap 120 together.

Figure 4A:
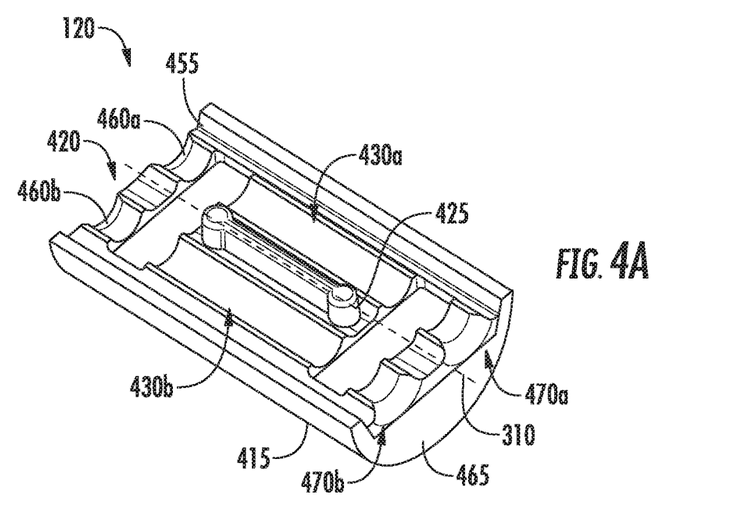
FIGS. 4A-4C are a plurality of side and perspective views illustrating an embodiment of a wire cap of the wire overmold device shown in FIGS. 1A and 1B.
Figure 4B:
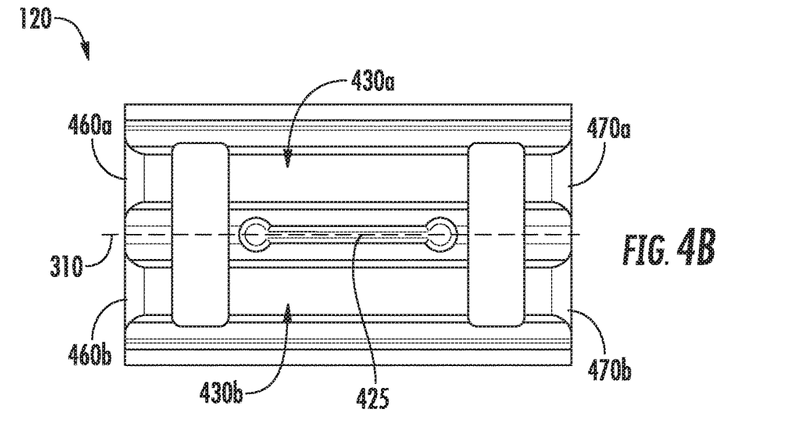
Figure 4C:
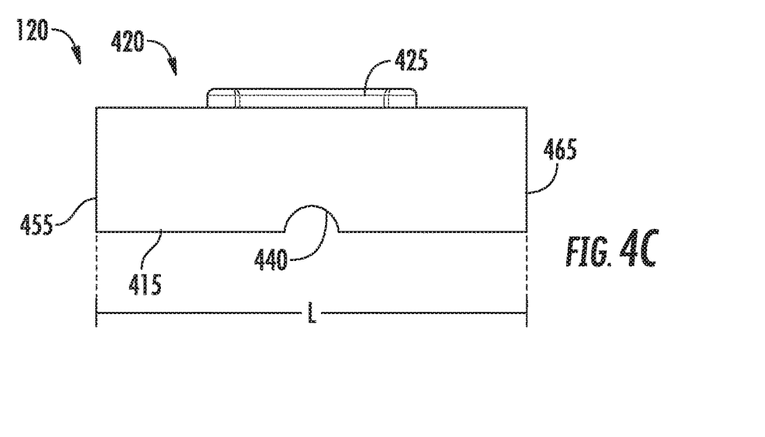

Detailed views illustrating the wire cap 120 are illustrated in FIGS. 4A-4C. The wire cap 120 may be an elongated semi-cylindrical body 405 extending along the axis 310 and may have a curved outer surface 415 and a top surface portion 420. The top surface portion 420 may extend in a direction substantially parallel to the axis 310. The wire cap 120 may be made from a variety of materials, including, but not limited to, plastic, composite, or the like. In embodiments, the wire cap 120 may be made of the same or different material from the carrier body 105. The wire cap 120 may be configured to couple to the carrier body 105 at the distal portion 355, with the top surface portion 320 of the carrier body 105 mating with the top surface portion 420 of the wire cap 120.

Cavities 430a, 430b may be formed in the top surface portion 420 and may extend into the semi-cylindrical body 405 in a direction parallel to the axis 310. The cavities 430a, 430b may be configured to at least partially receive and retain the wires 125a, 125b (see FIGS. 1A-2). As described above with respect to the carrier body 105, the cavities 430a, 430b should be sized and shaped to accommodate the wires 125a, 125b for a desired application, and should conform with the third portion 350a, 350b of the cavities 330a, 330b in the distal portion 355 of the carrier body 105.

The cavities 430a, 430b may extend the entire length L of the wire cap 120, extending from end face 460 to end face 465 of the wire cap 120. It is advantageous to form a rounded edge 470a, 470b at the respective ends of the cavities 430a, 430b in the end face 465 to prevent wire or jacketed cable damage such as may result from scratching or the like (see also FIG. 5E). In other embodiments, a chamfer or scallop cut may be formed at the respective ends of the cavities 430a, 430b at the end face 465. When attached, the end face 365 of the distal portion 355 of the carrier body 105 is coplanar with the end face 465 of the wire cap 120.

A protrusion 425 may be disposed between the cavities 430a, 430b for engagement with the recess 360 of the carrier body 105 (see FIG. 3D) to couple the wire cap 120 and the carrier body 105. The protrusion 425 and the corresponding recess 360 may be cylindrical, rectangular, irregular, etc. and may be adapted to mate with one another. It is understood, however, that the protrusion 425, and corresponding recess 360, may be designed to engage one another in a single orientation (i.e., a "mistake-proof" fit) to decrease assembly time. In other embodiments, the protrusion 425 and corresponding recess 360 may be adapted to allow mating engagement in more than one orientation. The protrusion 425 may extend in a direction opposite the semi-cylindrical body 415 and substantially perpendicular to the top surface portion 420 to engage with the recess 360 in the distal portion 355 of the carrier body 105.

In some embodiments, a groove 440 may be formed on the curved outer surface 415 opposite the top surface portion 420. As will be described below, the groove 440 may be advantageous for facilitating alignment and retention in the overmold 110. In some embodiments, a plurality of grooves may be formed on the curved outer surface 415 (see FIG. 5I), but this is not critical. The groove 440 may extend in a direction substantially perpendicular to the axis 310, thereby limiting axial movement of the wire cap 120 along the axis 310 with respect to the carrier body 105.

Referring now to FIGS. 5A-5I, an exemplary embodiment of a wire overmold device and molding process in accordance with the present disclosure are shown. A carrier body 105 may be configured to receive wires 125a, 125b and electronic components 500. The electronic components 505 may include a sensor, e.g., a Hall sensor. As described above, the electronic components 505 may be received in cavity 325 at a proximal end 115a of the carrier body 105. The wires 125a, 125b may each be connected to the electronic components 505 in any known manner, with the wires 125a, 125b extending in a direction along axis 310 toward a distal end 115a of the carrier body 105 in cavities 330a, 330b. The wires 125a, 125b extend to a distal portion 355 of the carrier body 105, and beyond an end face 365 of the distal portion 355.

Figure 5B:
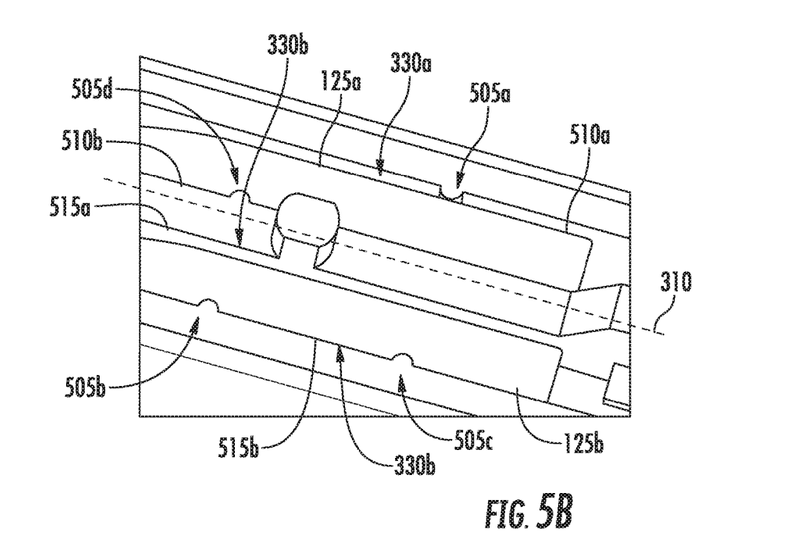
Figure 5C:
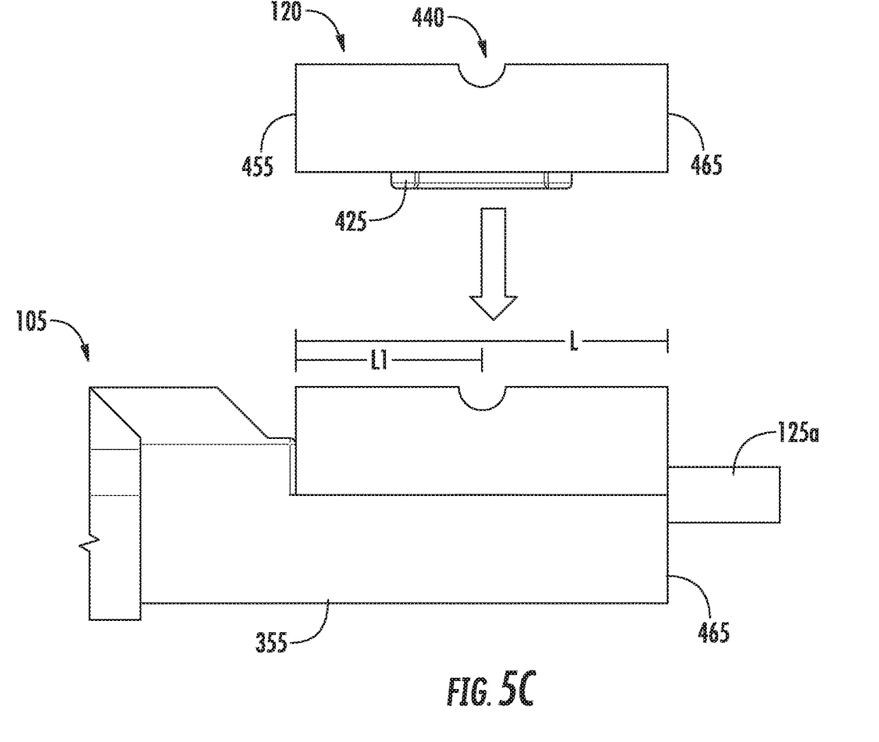

As shown in FIG. 5B, one or more ribs 505a, 505b . . . 505n may protrude into each of the cavities 330a, 330b. The ribs 505a, 505b . . . 505n may extend from side walls 510a, 510b, 515a, 515b in a direction substantially perpendicular to the longitudinal axes of the cavities 330a, 330b. The ribs 505a, 505b . . . 505n are configured to secure the wires 125a, 125b within the respective cavities 330a, 330b. Thus, when disposed in the respective cavities 330a, 330b, the wires 125a, 125b are securely retained and positioned ribs 505a, 505b . . . 505n in a consistent and repeatable manner, thereby eliminating unwanted shifting or movement and preventing potential damage during molding processes.

When the wires 125a, 125b are securely positioned in the carrier body 105, a wire cap 120 may be coupled to the carrier body 105, as shown in FIGS. 5C-5F. At least a third portion 350a, 350b of the cavities 330a, 330b of the distal portion 355 of the wire body 105 mate with the respective cavities 430a, 430b of the wire cap 120. As shown, when the wire cap 120 is coupled to the distal portion 355 of the carrier body 105, at least a portion of the wires 125a, 125b are enclosed and fixed in position, which is maintained throughout a molding process. The wire cap 120 is coupled to the distal portion 355 of the carrier body 105 by protrusion 425, which is configured to be received within recess 360 of the carrier body 105.

Figure 5D:
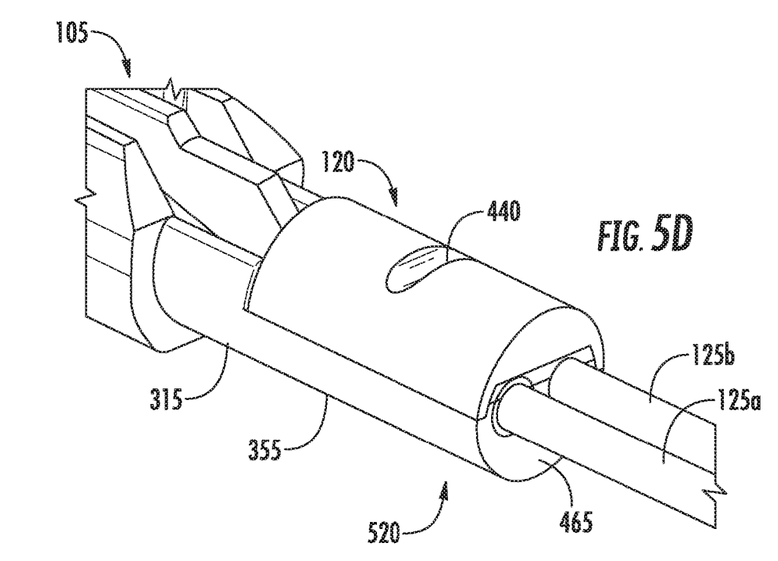
Figure 5E:
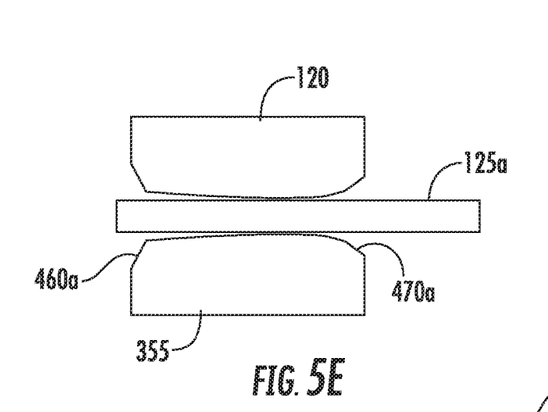
Figure 5F:
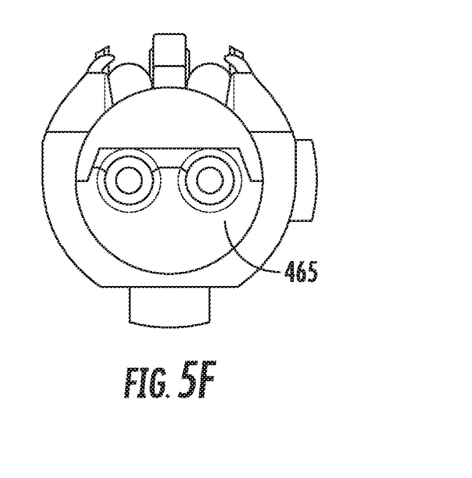

When assembled, the top surface portion 320 of the carrier body 105 is mated with the top surface portion 420 of the wire cap 120. In some embodiments, third portions 350a, 350b of cavities 330a, 330b are substantially equal in size and shape to the cavities 430a, 430b of the wire cap 120, so that the wires 125a, 125b are equally enclosed by the distal portion 355 of the carrier body 105 and the wire cap 125. In other embodiments, the third portions 350a, 350b of the cavities 330a, 330b enclose a greater portion of wires 125a, 125b than the cavities 430a, 430b of the wire cap 120 (see FIG. 5F). As shown in FIG. 5F, the third portions 350a, 350b of the cavities 330a, 330b surround a greater circumference of the wires 125a, 125b than the cavities 430a, 430b. In these embodiments, it may be advantageous to assemble the wires 125a, 125b in the larger third portions 350a, 350b of the cavities 330a, 330b, so that the wires 125a, 125b are held in position until the wire cap 120 is attached to the carrier body 105.

End face 455 of the wire cap 120 may abut a ledge 380 of the distal portion 355 of the carrier body 105, and end face 465 of the wire cap 120 may be aligned and coplanar with the end face 365 of the distal portion 355 of the carrier body 105. As shown in FIGS. 5D-5F, at least a portion of the curved surface portion 315 of the carrier body 105 has a curvature substantially similar to the curved surface portion 415 of the wire cap 120. When assembled, at least a portion of the semi-cylindrical body 305 of the distal portion 355 of the carrier body 105, and the semi-cylindrical body 405 of the wire cap 120 may form a substantially uniform cylindrical portion 520, thereby improving a molding process. The assembled carrier body 105, wire cap 120, wires 125a, 125b, and electronic components 505 form a sub-assembly 525.

Figure 5G:
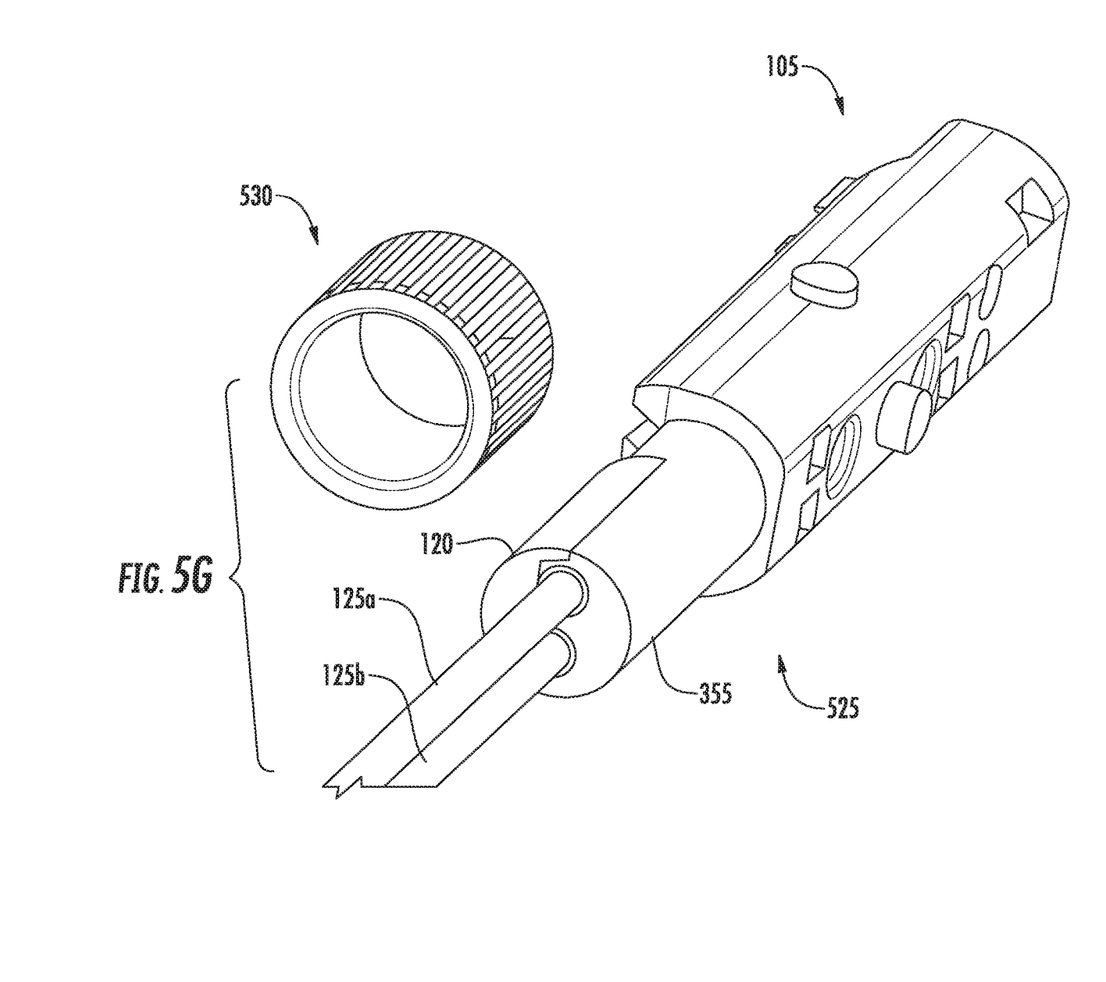
Figure 5H:
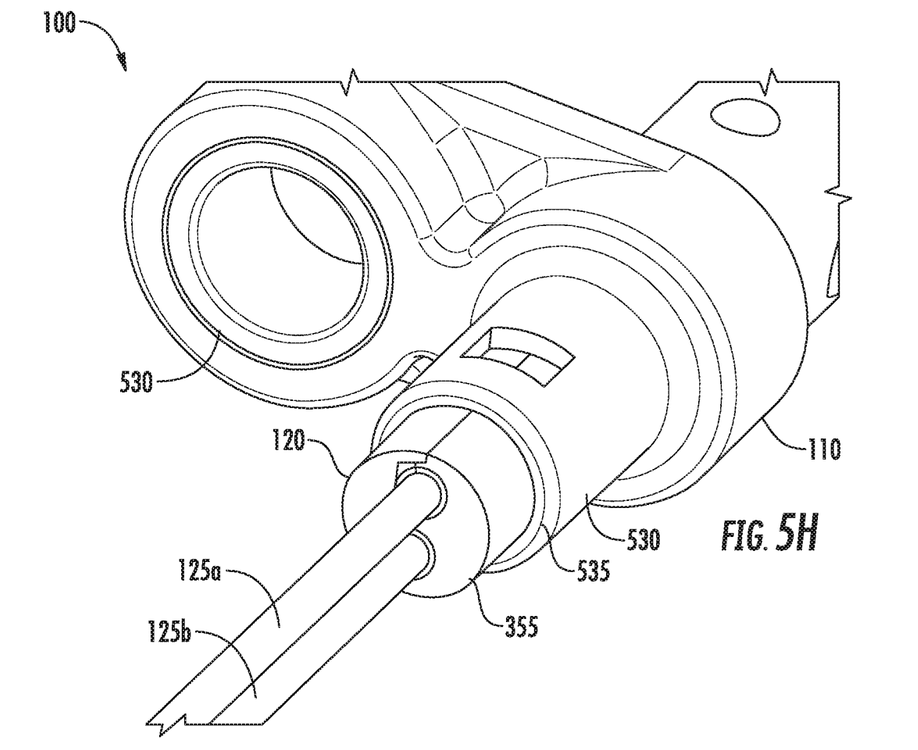
Figure 5I:
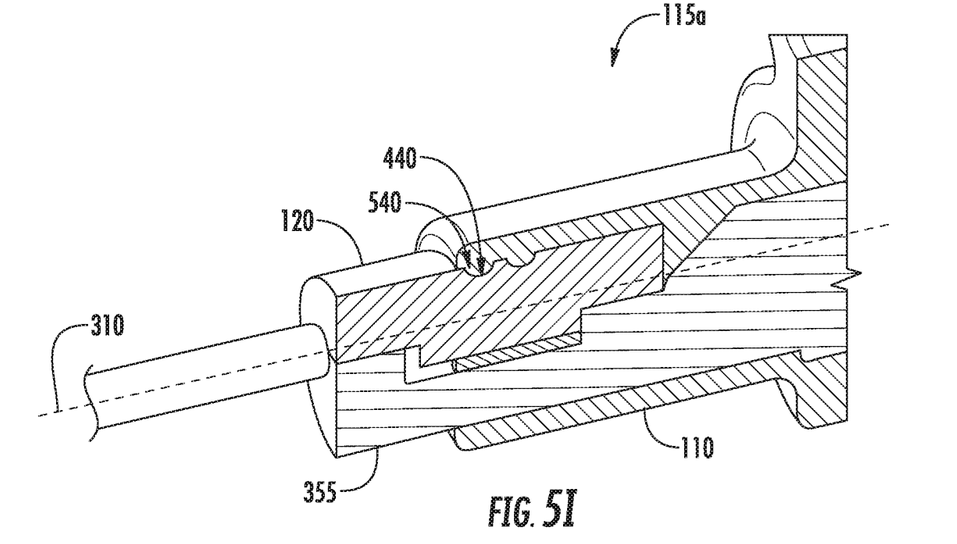

Referring now to FIGS. 5G and 5I, the sub-assembly 525 is positioned with respect to a bushing 530 in a mold for a molding process. The molding process forms an overmold 110 over the sub-assembly 525 and bushing 530, thereby forming the wire overmold device 100. The overmold 110 connects the sub-assembly 525 with the bushing 530, which facilitates connection to automotive components, e.g., a transmission. The overmold 110 may be formed of plastic, composite, or similar material.

As shown, the overmold 110 includes a substantially cylindrical portion 530 enclosing at least a portion of the wire cap 120 and at least a portion of the distal portion 355 of the carrier body 105. To protect the wires 125a, 125b extending out the distal end 115a of the wire overmold device 100, at least a portion of the wire cap 120 and the distal portion 355 of the carrier body 105 extend beyond an end 535 of the cylindrical portion 530 of the overmold 110. When the overmold 110 does not extend beyond the wire cap 120 and the distal portion 355 of the carrier body 105, a desired position of the wires 125a, 125b is maintained. A consistent and repeatable placement of wires with respect to a mold is ensured during a molding process, thereby preventing wire or jacketed cable damage.

The overmold 110 may be formed to encapsulate at least a substantial portion of the carrier body 105 so that the carrier body 105 is held in a fixed position in relation to the overmold 110. As described above, one or more grooves 440 in the curved outer surface 415 of the wire cap 120 may be configured to engage with the cylindrical portion 530. The molding process forms the overmold 110, filling in the groove 440 and forming a protrusion 540. The cylindrical portion 530 thereby retains the wire cap 120 in a fixed axial position along the axis 310. Additionally, the groove 440 provides a reference as to where the cylindrical portion 530 ends along the length L of the wire cap 120. For example, the groove 440 may be formed at a length L1, e.g., at a midpoint on the wire cap 120. The protrusion 540 of the overmold 110 may be formed at the end 535 of the cylindrical portion 530 of the overmold 110.

As used herein, references to "an embodiment," "an implementation," "an example," and/or equivalents is not intended to be interpreted as excluding the existence of additional embodiments also incorporating the recited features.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize its usefulness is not limited thereto and the present disclosure can be beneficially implemented in any number of environments for any number of purposes. Thus, the claims set forth below are to be construed in view of the full breadth and spirit of the present disclosure as described herein.

What is claimed is:

1. A wire overmold device, comprising:
   a carrier body having a distal end and a proximal end;
   a wire cap configured to engage the distal end of the carrier body;
   at least one of a jacketed cable and one or more wires at least partially enclosed between the wire cap and the carrier body; and
   an overmold formed over the proximal end of the carrier body and at least portions of the wire cap and the distal end of the carrier body;
   wherein the wire cap and the distal end of the carrier body protrude from the overmold.

2. The wire overmold device according to claim 1, wherein the carrier body is an elongated semi-cylindrical body having a curved outer surface and a top surface portion.

3. The wire overmold device according to claim 2, wherein one or more cavities are formed in the top surface portion and extend into the semi-cylindrical body.

4. The wire overmold device according to claim 2, wherein the wire cap includes a semi-cylindrical body and a top surface portion, the wire cap top surface portion mating with the carrier body top surface portion to enclose the at least one of a jacketed cable and one or more wires.

5. The wire overmold device according to claim 3, wherein a first cavity formed in the proximal end of the carrier body, the first cavity being configured to receive an electronic component.

6. The wire overmold device according to claim 3, wherein a second cavity extends from the proximal end of the carrier body, along the semi-cylindrical body, to the distal end of the carrier body, the second cavity being configured to receive a first wire.

7. The wire overmold device according to claim 4, wherein the wire cap includes a curved outer surface, the curved outer surface having a groove for engaging with the overmold.

8. The wire overmold device according to claim 6, wherein a third cavity extends from the proximal end of the carrier body, along the semi-cylindrical body, to a distal end of the carrier body, the third cavity being configured to receive a second wire, wherein the second cavity and the third cavity are substantially parallel to each other.

9. The wire overmold device according to claim 1, wherein the wire cap includes a protrusion, the protrusion being receivable in a corresponding recess in the distal end of the carrier body such that the at least one of the jacketed cable and one or more wires are at least partially enclosed between the wire cap and the distal end of the carrier body.

10. The wire overmold device according to claim 1, wherein the overmold is formed over a bushing, the bushing being adjacent to the carrier body.

* * * * *